(12) United States Patent
Eickhoff et al.

(10) Patent No.: US 6,732,589 B2
(45) Date of Patent: May 11, 2004

(54) PRESSURE SENSOR, A METHOD FOR MANUFACTURING A PRESSURE SENSOR AND A COMBUSTION ENGINE HAVING A PRESSURE SENSOR

(75) Inventors: Martin Eickhoff, Ismaning (DE); Gerhard Krötz, München (DE); Christoph Richter, Holzkirchen (DE); Claudi Cavalloni, Regensdorf (CH); Marco Gnielka, Winterthur (CH)

(73) Assignees: EADS Deutschland GmbH, Munich (DE); Kistler Holding AG, Winterthur (CH)

( * ) Notice: Subject to any disclaimer, the term of this patent is extended or adjusted under 35 U.S.C. 154(b) by 0 days.

(21) Appl. No.: 09/905,583

(22) Filed: Jul. 13, 2001

(65) Prior Publication Data

US 2002/0100330 A1 Aug. 1, 2002

(30) Foreign Application Priority Data

Jul. 14, 2000 (DE) .......................................... 100 34 390

(51) Int. Cl.⁷ ................................................ G01L 7/08
(52) U.S. Cl. ............................ 73/715; 73/716; 73/724; 73/725; 73/861.02; 73/861.22; 73/861.24
(58) Field of Search .......................... 73/702, 715, 716, 73/717, 724, 725, 727, 861.02, 861.22, 861.24, 704; 338/42, 92

(56) References Cited

U.S. PATENT DOCUMENTS

| 4,015,573 A | * | 4/1977 | Okura et al. ................. 123/382 |
| 4,030,366 A | * | 6/1977 | Kazahaya et al. ............ 73/715 |
| 4,732,042 A | * | 3/1988 | Adams ........................ 73/706 |
| 4,926,695 A | * | 5/1990 | Kleven et al. ............. 73/861.24 |
| 5,123,282 A | * | 6/1992 | Ikeda et al. .................... 73/704 |
| 5,132,658 A | * | 7/1992 | Dauenhauer et al. ......... 338/92 |
| 5,317,917 A | * | 6/1994 | Dufour ........................ 73/702 |
| 5,824,910 A | * | 10/1998 | Last et al. .................... 73/715 |
| 5,995,659 A | * | 11/1999 | Chakraborty et al. ....... 382/176 |

* cited by examiner

Primary Examiner—Charles H. Nolan, Jr.
Assistant Examiner—Marissa Ferguson
(74) Attorney, Agent, or Firm—Kenyon & Kenyon

(57) ABSTRACT

A pressure sensor includes a housing, an interior chamber of which is sealed by a diaphragm, and a flexible measuring element, which is positioned separately. In addition, the pressure sensor includes a transmission element, which is formed as a chip and is used to transmit force from the diaphragm to the measuring element. In response to a selected deformation of the measuring element, a stop element comes into contact with a region of the transmission element and opposes the applied force. Therefore, it forms an overload protection. The stop element may be configured as a bending bar and/or form a second measuring element, the first measuring element being configured to measure relatively low pressures, and the second measuring element or stop element being configured to measure relatively high pressures. The pressure sensor thus provides a plurality of measuring ranges.

44 Claims, 3 Drawing Sheets

PRESSURE SENSOR, A METHOD FOR MANUFACTURING A PRESSURE SENSOR AND A COMBUSTION ENGINE HAVING A PRESSURE SENSOR

FIELD OF THE INVENTION

The present invention relates to a pressure sensor, a method for manufacturing a pressure sensor, and an internal combustion engine having a pressure sensor.

BACKGROUND INFORMATION

Pressure sensors are used in various branches of engineering in order to measure the pressures of gases or liquids. The pressure sensors are often subjected to high loads that depend on the current state of the medium in which the measurement is performed. Frequently, the pressures acting on the pressure sensor vary considerably. A pressure sensor must therefore withstand high loads, and it must deliver exact measuring results.

Conventional pressure sensors include a diaphragm, which deforms in response to a pressure difference on the two sides of the diaphragm. The deformation of the diaphragm is measured by piezoelectric elements, which are situated on one side of the diaphragm.

In the case of high pressure or temperature loads, there is the problem of the pressure-sensor diaphragm twisting or warping in its frame or suspension. The consequences include inaccurate measurements or invalid measuring results, which occur in response to high pressure or temperature fluctuations.

Therefore, it is an object of the present invention to provide a pressure sensor, which delivers accurate measuring results, and may be configured so that it withstands high pressures, and functions reliably in the case of large pressure or temperature differences. It is another object of the present invention to provide a method for manufacturing such a pressure sensor which may be implemented quickly and cost-effectively. It is a further object of the present invention to provide a combustion engine that may attain lower emissions and/or an improved efficiency.

SUMMARY

The above and other beneficial objects of the present invention are achieved by providing a pressure sensor, a method for manufacturing a pressure sensor and a combustion engine as described herein.

The pressure sensor according to the present invention includes a housing, the interior chamber of which is sealed by a diaphragm, an arrangement configured to generate a signal in response to the diaphragm being deformed, and also a flexible measuring element, which is included in addition to, i.e., positioned separately from the diaphragm, and is coupled to the diaphragm. The arrangement configured to generate a signal being coupled to the flexible measuring element, in order to generate the measuring signal in response to the flexible measuring element deforming.

The pressure sensor according to the present invention prevents the measuring results from being invalidated by twisting or warping of the diaphragm. The additional, flexible measuring element positioned separately from the diaphragm allows measuring results to be achieved, which are still relatively accurate, even in the case of a diaphragm that is twisted or warped in itself. The pressure sensor may even perform accurate and reliable measurements in the case of high pressures or pressure differences, and/or in the case of sharply changing temperatures, the pressure sensor also having an increased service life.

The measuring element may include a bendable bar, one end of which is freely suspended. In this manner, a deformation of the diaphragm, which is caused by a pressure acting on the diaphragm, may be transmitted to the bendable bar, and the pressure may be picked up and measured separately from the deformation of the diaphragm. The measuring or deformation element may, for example, be formed in the shape of a tongue. The measuring signal is generated by the deformation of the measuring element. The bar may relax in response to undesired twisting or warping. This prevents the measuring results from being invalidated. In addition, the pressure sensor may include a stop element, which opposes the deformation force in response to a selected deformation of the measuring element. This arrangement provides overload protection against high pressures, the overload protection being independent of the output signal. That is, the measuring element may be designed for high sensitivity and nevertheless withstand relatively high pressures. Therefore, there is no loss of sensitivity at the measuring element, even in the case of high pressure loads. The pressure sensor may also measure the applied pressure under high pressure loads, without the danger of destroying the measuring element. The stop element may be rigid, so that the measuring element does not bend or deform further upon reaching the stop, or the stop element may be designed to be bendable or flexible.

The stop element may be in the form of a second, flexible measuring element, which, for example, is harder or flexurally stiffer than the first measuring element. This arrangement allows the pressure sensor to have a plurality of measuring ranges and to be, e.g., suitable for measuring in the low pressure range and also, or simultaneously, in the high pressure range. At relatively low pressures, only the first measuring element is initially deformed. The stop element or second, flexible measuring element also deforms at or beyond a selected deformation of the first measuring element.

Because of the high resistance of the stop element or second measuring element, the first measuring element only bends or deforms a little more, even at high, applied pressures, so that it is protected from overload. Thus, at or above a selected pressure, it is only possible to further deform the first and the stiffer, second measuring elements at relatively high pressures. Therefore, the second measuring element opens up an additional measuring range for relatively high pressures.

The stop element may be configured as a half-open or semienclosed diaphragm, or it may be tongue-like or a bendable bar, the end of which may be freely suspended. The stop element may be fixed on one end. The stop bar may be configured similarly to or exactly like the first measuring element.

The first measuring element and/or the second measuring element may be provided with one or more piezoelectric elements as the arrangement configured to generate signals. For example, the signal generation arrangement may include piezoresistors, which may be connected to a Wheatstone bridge.

The pressure sensor may include a deformable transmission element configured to transmit force between the diaphragm and the measuring element and/or the stop element. The transmission element may have a selected elasticity or bending resistance. For example, the measuring range or the measuring ranges of the pressure sensor are determined by the stiffness or hardness of the transmission element. In this manner, measurements may be performed at relatively high pressures applied to the diaphragm using a relatively soft measuring element having a high sensitivity.

The transmission element may be configured as a diaphragm and/or as a chip, and its thickness is selected for determining the measuring range or the measuring ranges of the pressure sensor. That is, the measuring range or the measuring ranges of the pressure sensor may be controlled by varying or selectively setting the thickness of the transmission element or the transmission diaphragm.

The transmission element may be configured to be stiffer than the diaphragm or steel diaphragm. Therefore, adjustment inaccuracies during assembly carry over correspondingly less sharply to the transmission element than to the diaphragm. The steel diaphragm or diaphragm deflects outwardly to a greater degree than the transmission element deflects inwardly.

The first measuring element and/or the second measuring element may be configured as a bar or tongue in a chip, the two measuring elements being disposed in a single chip, which consequently forms a measuring chip.

The pressure sensor may have at least two measuring ranges, e.g., the first measuring range covering a range of 0 to 20 bar, e.g., 0 to 10 bar or 0 to 2 bar, while, e.g., the second measuring range covers a range of 0 to 300 bar, e.g., 0 to 250 bar or 0 to 200 bar.

The pressure sensor may have overload protection, which, for example, may be in the range of 250 bar.

The deformable or flexible diaphragm may be manufactured from steel. This arrangement allows the diaphragm to be connected to the housing in a particularly effective and secure manner, e.g., by welding. In the case of using steel or metal as a material for the diaphragm and the housing, the thermal coefficients also match each other very well, so that the measurement accuracy and stability are also high in the case of variable temperatures or temperature fluctuations.

At least one of the elements of the pressure sensor, e.g., diaphragm, transmission element, measuring element, and/or stop element, may be manufactured with an aiming-off allowance in order to compensate for manufacturing tolerances during coupling, the diaphragm being lightly curved to the outside due to the aiming-off allowance.

Furthermore, the present invention provides a method for manufacturing the pressure sensor, the method include the steps of: providing a housing having an interior chamber, which is sealed or may be sealed by a diaphragm; providing a support structure, which, for example, supports at least one bendable or flexible measuring element on its upper side; inserting the support structure along with the bendable measuring element into the housing; and sealing the interior chamber. Using this method, a pressure sensor having a high measurement accuracy may be manufactured in a relatively simple and, therefore, inexpensive manner. The method may be used for manufacturing a pressure sensor as described above.

A stop element or a second bendable measuring element, which, in the installed state, opposes a deformation force at or above a predetermined pressure on the diaphragm, may be on the support structure or its upper side.

During manufacturing, manufacturing tolerances may be compensated for by an aiming-off allowance, and the diaphragm, for example, is slightly pressed to the outside by the transmission element or another component part. This allows a high degree of accuracy to be achieved over the entire measuring range, even when the component parts are not exact.

The support structure or base plate may be fixed in place, preferably by a sleeve or a ring, after, e.g., inserting, introducing or mounting the support structure. The diaphragm may be welded to the housing.

The pressure sensor according to the present invention may measure the applied pressure under high pressure loads with a high degree of accuracy. The pressure sensor may be designed to simultaneously measure high and low pressures, the pressure sensor also having a high resolution in the low pressure range. Measurements may be taken in the high and low pressure ranges without costly, additional arrangements, such as, e.g., various pieces of electronic amplifying equipment. The time and the costs are especially reduced, since it is not necessary to switch over between ranges. In addition, the pressure sensor only requires a small space.

An application may include in determining the combustion chamber pressure or cylinder pressure in an internal combustion engine, in order to improve combustion or achieve an improved efficiency in conjunction with a suitable control system. For example, the pressure is accurately measured during the intake or exhaust stroke, the pressure sensor simultaneously withstanding the high pressures occurring in the combustion chamber during the combustion process. In this context, any such engine, e.g., an Otto or diesel engine, may include such a pressure sensor. The pressure sensor may, for example, be arranged in the wall of an engine cylinder.

DETAILED DESCRIPTION

Figure 1:
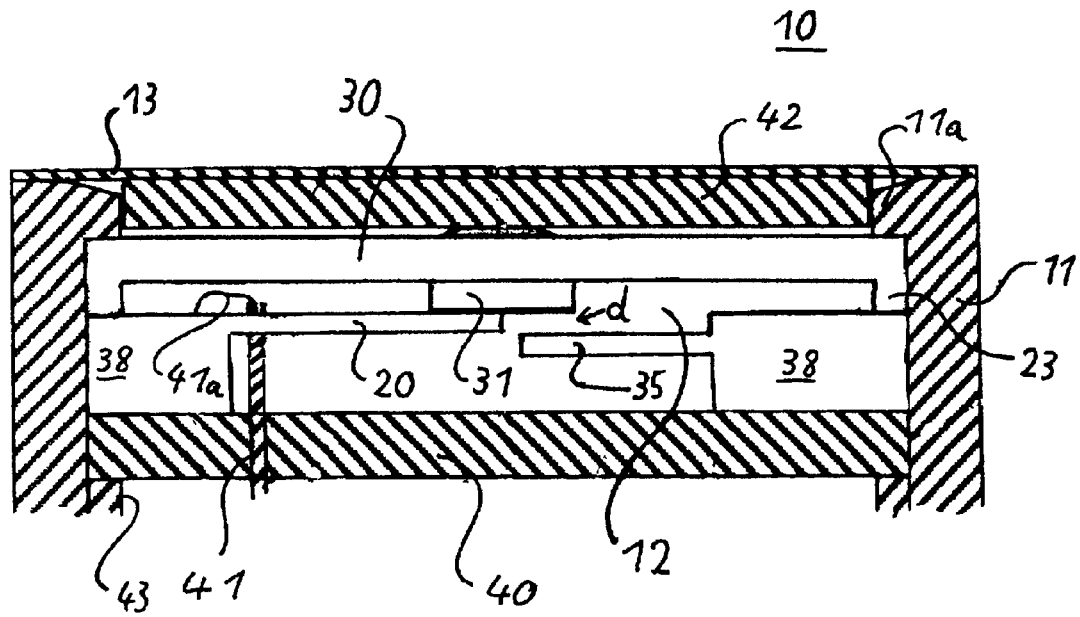
FIG. 1 is a schematic cross-sectional view of an example embodiment of a pressure sensor according to the present invention.

FIG. 1 is a schematic cross-sectional view of a pressure sensor 10. Pressure sensor 10 includes a housing 11, which encloses an interior chamber 12. The upper side of pressure sensor 10 includes a diaphragm 13, which seals interior chamber 12 from above. Situated in interior chamber 12, underneath diaphragm 13, is a separate measuring element 20, which is mechanically coupled to diaphragm 13 and spatially separated from diaphragm 13. A pressure difference between the outside and the interior chamber causes diaphragm 13 to deform, and the coupling causes the measuring element 20 coupled to diaphragm 13 to simultaneously deform.

A transmission element 30, which is arranged between diaphragm 13 and measuring element 20, is configured to transmit a force applied externally to diaphragm 13 to measuring element 20. An elevation or a projection arranged on the upper side of transmission element 30 in the center is configured to mechanically couple transmission element 30 to diaphragm 13, and additional steel protuberance 42 being disposed between the elevation and diaphragm 13. Protuberance 42 forms a center-boss structure or a transmission element, in order to transmit the force to transmission element 30 in response to an externally applied pressure on diaphragm 13. Transmission element 30 is also in the form of a diaphragm, which is fixed in position on its edges, and the center of which may deflect.

With its circular shape, transmission element 30 includes an edge region 23, which is thicker than the adjoining regions, and extends down, so that transmission element 30 is set apart from a subjacent chip 38, only a region 31 in the center of transmission element 30 touching measuring element 20. However, the transmission element does not have to be circular. Transmission element may, for example, be rectangular, square, or elliptical. A stop element 35 is also arranged on the side of the transmission element on which measuring element 20 is disposed. But in contrast to measuring element 20, stop element 35 is arranged at a distance d from region 31 of transmission element 30. Distance d is selected to be so large that stop element 35 only comes into contact with region 31 at or above a certain external pressure on diaphragm 13. That is, region 31 only touches stop element 35 at or beyond a selected deformation of measuring element 20. This arrangement prevents measuring element 20 from bending further or only allows it to continue bending when an increased force or pressure is applied to diaphragm 13.

In the example embodiment of the present invention illustrated, stop element 35 is configured to be flexible or configured as a bendable bar, like measuring element 20. However, it may also be configured to be rigid in order to be used purely as overload protection. Measuring element 20 and stop element 35 are positioned on a base plate 40 or support structure, which forms an electrical bushing or feed-through lead. The electrical bushing seals cylindrical housing 11 in a pressure-tight manner from below, i.e., from the side opposite diaphragm 13. Base plate 40 has a circular cross-section in order to fit onto the inside of the wall of cylindrical housing 11. Provided in base plate 40 or in the electrical bushing is a sleeve 41, through which an electrical connection or line 41a is fed in a pressure-tight manner into interior chamber 12 to measuring element 20 and possibly to stop element 35.

Measuring element 20 and stop element 35 are components of chip 38, which may be manufactured from silicon. However, other suitable materials may be used for this purpose. The chip surface and the upper surface of measuring element 20 are on the same level, while a region of chip 38 has a lower-lying surface thereby forming stop element 35, which only comes into contact with region 31 of transmission element 20 at or above a certain pressure that acts externally on diaphragm 13. However, it is possible to design measuring element 20 and stop element 35 to be on the same level and to provide gradations or steps or different levels on transmission element 30 so that transmission element 30 only comes into contact with stop element 35 at or above a certain pressure.

Measuring element 20 is thinner than the rest of chip 38 so that its front end is suspended freely over base plate 40 and it may be bent down through transmission element 35 in the direction of base plate 40 in response to a force acting from above. The piezoelectric measuring element 20 configured as a bending bar may be, for example, configured to be relatively thin and flexible for measurements in the low pressure range, e.g., in the range of 0 to 10 bar or in the range of 0 to 2 bar, so that its piezoelectric elements achieve a high measurement accuracy and resolution for this range of relatively low pressure.

In the example embodiment of the present invention illustrated, stop element 35 is in the form of a bar or tongue, which is substantially similar to or the same as measuring element 20 described above. However, the stop element is configured to have a greater hardness or stiffness, which, for example, may easily be achieved over the length and/or the width. It forms a second measuring element, which is suitable for measurements in the range of higher pressures, e.g., in the range of up to 300 bar or up to 200 bar. However, other ranges are also possible. The stop element is simultaneously used as stop, as is described above. Therefore, the combination with first measuring element 30 results in a low pressure range of 0 to 10 bar or 0 to 2 bar, with high resolution, and a high pressure range of 0 to 300 bar or 0 to 200 bar, with a lower resolution. Therefore, the sensor has two different measuring ranges, each of which provides the best possible resolution.

Figure 2:
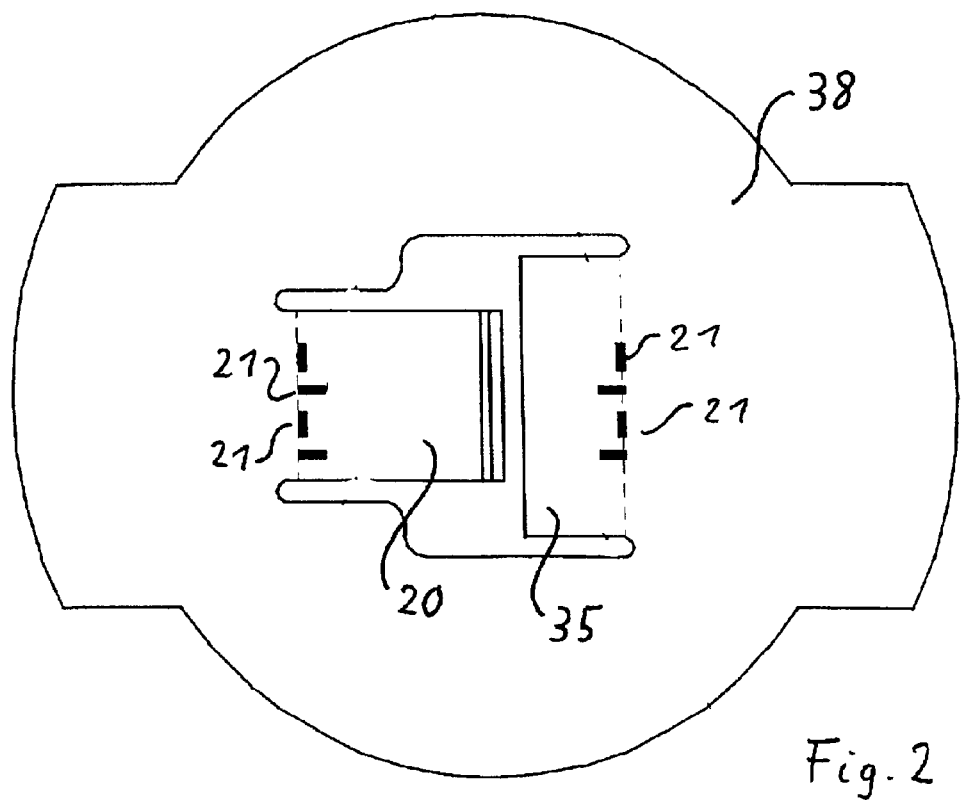
FIG. 2 is a schematic plan view of a measuring chip of the pressure sensor according to the present invention, the measuring chip having two measuring elements.

Schematically illustrated in FIG. 2 is chip 38, in which measuring element 20 and stop element 35 are integrated or provided. Chip 38 is manufactured using micromechanics or microtechnology. A bar or tongue is patterned in a subsection of chip 38 to form measuring element 20 and stop element 35. Openings or recesses, which, e.g., may accommodate pins for wire bonding, are provided on both sides, on one side or on the side of measuring element 20 and stop element 35.

Measuring element 20 and stop element 35 include piezoelectric elements or piezoresistors 21, which are connected to a Wheatstone bridge and form an arrangement for signal generation. Therefore, an electrical signal is generated in response to measuring element 20 or stop element bending, deforming, or elongating. In this context, the signal generation is a function of the degree of deformation or elongation of measuring element 20 or stop element 35, which is caused by the external pressure acting on diaphragm 13.

Figure 3:
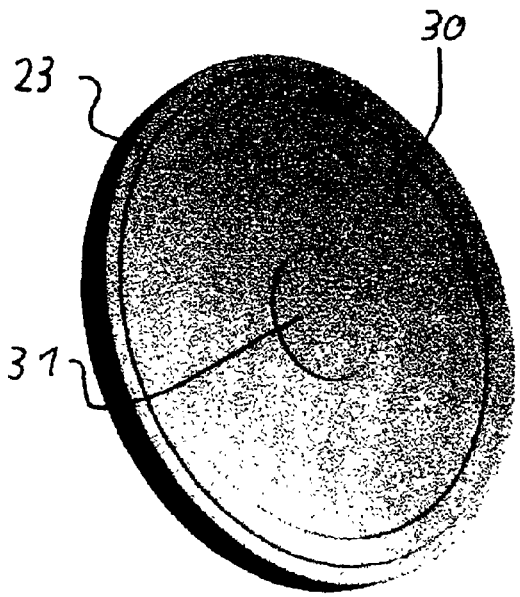
FIG. 3 is a schematic perspective view of a transmission element in the form of a chip.

FIG. 3 is a schematic perspective view of transmission element 30 from below. Transmission element 30 is a diaphragm, which is manufactured by microtechnology or micromechanics, and includes an elevation or projection on both the upper and lower sides of its center. The elevation on the lower side forms region 31, which is in contact with the bending bar or piezoelectric measuring element 20, and bends it downwardly in response to a compressive force acting on diaphragm 13 from above.

The thickness or stiffness of transmission element 30 or the transmission diaphragm directly affects the measuring range of the pressure sensor. Therefore, the measuring range may be controlled by varying the thickness of transmission element 30. Transmission element 30 and stop element 35 provide a multiple overload protection for the sensor, without a loss of sensitivity at the measuring chip or measuring element 20. In this context, the overload protection is independent of the output signal, and the silicon bending bar or measuring element 20 may expand to the limit so that the result is a very high sensitivity.

The functioning principle of the multirange pressure sensor according to a further example embodiment of the present invention is described below with reference to FIGS. 4a to 4c.

Figure 4:
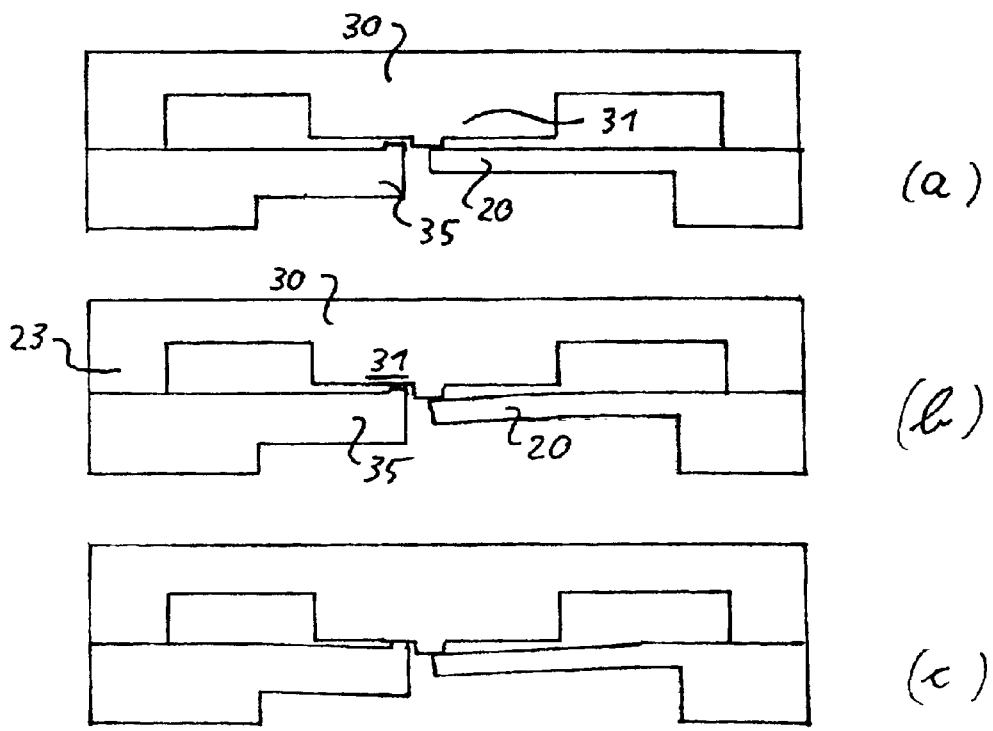
FIGS. 4a to 4c are schematic cross-sectional views of a pressure sensor in three different states in accordance with another example embodiment of the present invention.

Without illustrating the housing, FIG. 4a illustrates a state in which no pressure is applied. The two measuring elements 20, 35 or deformation elements are not deformed.

Upon application of an external pressure, which is greater than the pressure in interior chamber 12, the pressure difference causes diaphragm 13 to bend downwardly, i.e., in the direction of interior chamber 12. In this manner, the center of transmission chip 30, which is coupled to diaphragm 13, is pressed down and thus transmits the force to measuring element 20, which consequently bends. In response to a low pressure, e.g., between 0 and 2 bar, measuring element 20 bends through region 31 of transmission element 30, without stop element 35 coming into contact with the transmission element.

FIG. 4b illustrates a state on the boundary of the low pressure range, which is reached in response to a further increase in the external pressure or the pressure difference between the outside and the interior chamber. The center of transmission element 30 is pressed down so that region 31 of transmission element 30 touches stop element 35.

In the case of a rigid stop element, the further deflection of region 21 and the accompanying bending of measuring element 20 is limited by the contact with stop element 35.

FIG. 4c illustrates the state in the high pressure range, when deflecting element 35 is configured as a flexible bar or bending bar. In this case, transmission element 30 deflects further, but higher pressures are necessary. The harder configuration of stop element 35 only allows first measuring element 20 and stop element 35 to bend a little more, even in the case of very high pressures, so that stop element 35 also provides overload protection for measuring element 20. At the same time, the stop element 35 in the form of a second measuring element allows a measurement to be taken in the high pressure range.

Figure 5:
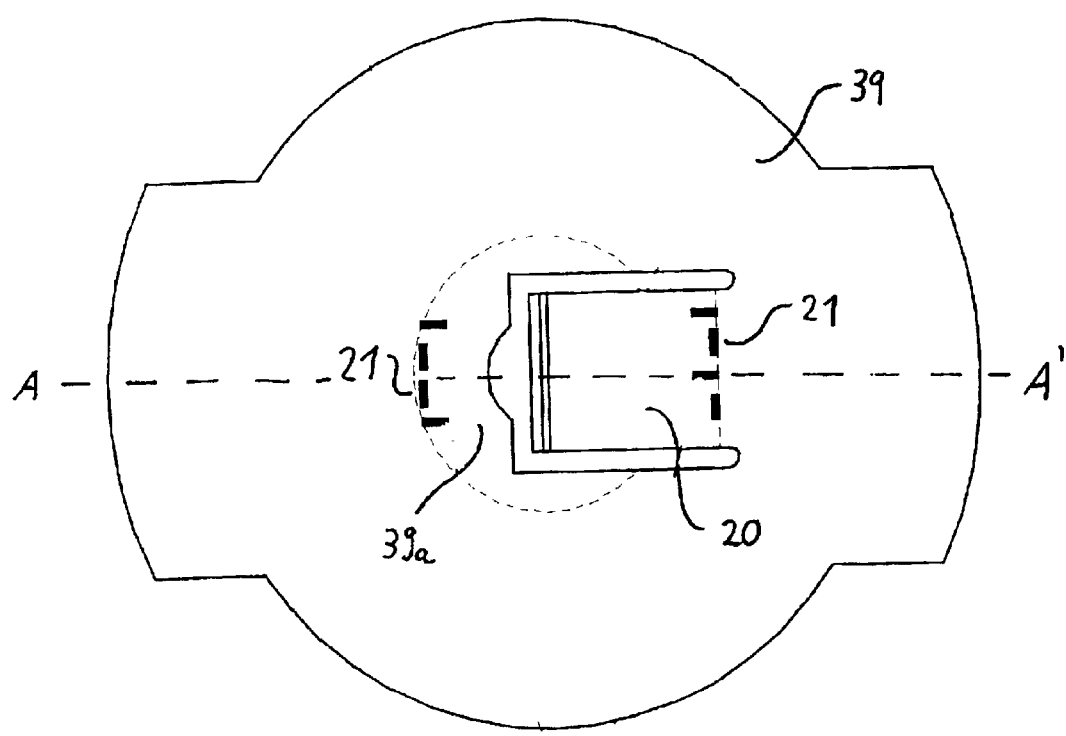
FIG. 5 is a schematic plan view of a measuring chip of the pressure sensor having a semienclosed diaphragm as a second measuring element in accordance with still another example embodiment of the present invention.

FIG. 5 illustrates a further example embodiment of a measuring chip or chip 39, which is a deformation structure like chip 38 illustrated in FIG. 2. Measuring element 20 having piezoresistors 21 is substantially configured like the example embodiment of the present invention illustrated in FIG. 2. A subsection of chip 39 is in the form of a semienclosed diaphragm 39a and is used as an additional deformation element for measurements in the high pressure range. Like measuring element 20, semienclosed diaphragm 39a carries piezoresistors 21, which are connected to a Wheatstone bridge, i.e., there is a bridge circuit on both measuring element 20 and semienclosed diaphragm 39a, which forms a second measuring element or stop element.

Figure 6:
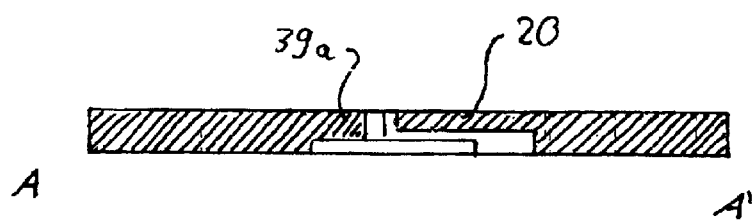
FIG. 6 is a schematic cross-sectional view of the measuring chip illustrated in FIG. 5 taken along line A—A'.

FIG. 6 schematically illustrates a section of chip 39 illustrated in FIG. 5. Semienclosed diaphragm 39a has a somewhat thicker shape than the first measuring element 20, which is in the form of a bar. The stiffness or elasticity of semienclosed diaphragm 39a, which is opposite to the free end of first measuring element 20, determines the measuring range, while the elasticity or stiffness of first measuring element 20, which, e.g., is determined by the length and/or the width of the bar, defines the measuring range for the low pressure range. As described above, a second bar or a tongue may also be configured analogously to the first measuring element, in place of semienclosed diaphragm 39a.

The manufacturing method of the present invention is described below with reference to FIG. 1.

In this context, a cylindrical housing is initially provided, which may be manufactured from steel. The upper side of housing 11 is sealed by diaphragm 13, which is manufactured from steel and supports protuberance 42 on its lower side as a center-boss structure.

Transmission element 30 is microtechnically manufactured as a chip, so that it forms a diaphragm having a protuberance or projecting rim on the edge, which is used as a spacer for subjacent measuring chip 38, 39. The center of transmission element 30 is provided with elevations or projections in order to mechanically couple it to diaphragm structure 13 of housing 11 and couple it later to measuring element 20 and stop element 35.

Measuring chip 38, 39 is microtechnically manufactured from silicon, as well, at least one measuring element 20 being patterned in a region.

Stop element 35 is formed in another region of measuring chip 38, 39, the stop element being dimensioned so that it does not obstruct the deflection of transmission element 30 during a measurement in the low pressure range, while it comes into contact with transmission element 30 in response to a limit pressure being exceeded.

Measuring chip 38, 39 is attached to base plate 40, which includes or forms an electrical bushing. This arrangement forms the electrical contact between the measuring element (s) and the outside.

Transmission element 30 is now introduced from below, i.e., from the side opposite to diaphragm 13, into housing 11, a projection 11a in the upper edge region of housing 11 limiting its further advance. Subsequently or simultaneously to inserting transmission element 30, electrical feed-through lead 40, which has measuring chip 38, 39 attached thereto, is inserted into housing 11. Its further advance is limited by projecting edge region 23 of transmission element 30 when electrical bushing 40, which has measuring chip 38, 39 thereon reaches its end position.

A ring or a sleeve 43, which matches the inner diameter of housing 11, is then inserted and welded to housing 11. Sleeve 43 is used to retain inserted elements in housing 11, the various elements being exactly positioned or fixed in place by projections 11a and sleeve 43.

One or more of the inserted elements and/or diaphragm 13 and/or protuberance 42 are manufactured with an aiming-off allowance, so that, prior to the insertion and fixing of the elements, the steel diaphragm or diaphragm 13 is pressed slightly outward. This arrangement compensates for manufacturing tolerances which, e.g., may be in the range of 10 $\mu$m.

The pressure sensor, which operates in a piezoresistive manner, is manufactured using SOI technology, and has a resolution of 0.01 bar. When stop element 35 is configured as an additional measuring element, the pressure sensor has an additional measuring range, which may be 10 to 100 times larger than the first measuring range.

In the example embodiments of the present invention described above, the chips have a temperature range of −50° C. to 350° C., and the diaphragm functions in the temperature range of −50° C. to 450° C.

Therefore, the pressure sensor is also suitable for measurements in the combustion chamber of engines or internal combustion engines. In general, the sensor may be used for measuring pressure in measuring ranges, which vary considerably and differ by orders of magnitude.

What is claimed is:

1. A pressure sensor, comprising:
    a housing having an interior chamber;
    a diaphragm sealing the interior chamber;
    a deformable first measuring element coupled to the diaphragm; and
    an arrangement coupled to the first measuring element, the arrangement being configured to generate a signal in response to a deformation of the diaphragm and to generate a signal in response to a deformation of the first measuring element, wherein the deformation of the first measuring element is responsive to the deformation of the diaphragm.

2. The pressure sensor according to claim 1, wherein the first measuring element includes a bendable bar having one end freely suspended.

3. The pressure sensor according to claim 1, further comprising a stop element, the stop element being configured to oppose a deformation force in response to a predetermined deformation of the first measuring element.

4. The pressure sensor according to claim 3, wherein the stop element includes a flexible second measuring element, the second measuring element being one of harder and flexurally stiffer then the first measuring element.

5. The pressure sensor according to claim 3, wherein the stop element includes one of a half-open diaphragm and a bendable bar having one end freely suspended.

6. The pressure sensor according to claim 3, wherein at least one of the first measuring element and the stop element includes at least one piezoelectric element.

7. The pressure sensor according to claim 1, wherein the arrangement includes a piezoresistor connected to a Wheatstone bridge.

8. The pressure sensor according to claim 3, further comprising a transmission element configured to transmit force from the diaphragm to at least one of the first measuring element and the stop element.

9. The pressure sensor according to claim 8, wherein the transmission element includes one of a selected elasticity and a selected flexural stiffness, one of a measuring range and measuring ranges of the pressure sensor being determined in accordance with the one of the selected elasticity and the selected flexural stiffness.

10. The pressure sensor according to claim 8, wherein the transmission element includes at least one of a diaphragm and a chip, the at least one of the diaphragm and the chip having a thickness, one of a measuring range and measuring ranges of the pressure sensor being determined in accordance with the thickness.

11. The pressure sensor according to claim 3, wherein at least one of the first measuring element and the stop element includes one of a bar and a tongue disposed in a chip.

12. The pressure sensor according to claim 11, wherein the chip is a single chip.

13. The pressure sensor according to claim 1, wherein the pressure sensor is configured to measure at least two measuring ranges.

14. The pressure sensor according to claim 13, wherein a first measuring range of the at least two measuring ranges is 0 to 10 bar and a second measuring range of the at least two measuring ranges is 0 to 300 bar.

15. The pressure sensor according to claim 14, wherein the first measuring range is 0 to 2 bar.

16. The pressure sensor according to claim 14, wherein the second measuring range is 0 to 200 bar.

17. The pressure sensor according to claim 15, wherein the second measuring range is 0 to 200 bar.

18. The pressure sensor according to claim 1, further comprising an overload protection device.

19. The pressure sensor according to claim 18, wherein the overload protection device is configured to provide overload protection at approximately 300 bar.

20. The pressure sensor according to claim 18, wherein the overload protection device is configured to provide overload protection at approximately 250 bar.

21. The pressure sensor according to claim 1, wherein the diaphragm is formed of steel.

22. The pressure sensor according to claim 8, wherein at least one of the diaphragm, the transmission element, the first measuring element and the stop element includes an aiming-off allowance, the aiming-off allowance being configured to compensate for manufacturing tolerances during coupling;

and wherein the diaphragm is slightly curved to an outside in accordance with the aiming-off allowance.

23. A method of using a pressure sensor, the pressure sensor including:
 a housing having an interior chamber;
 a diaphragm sealing the interior chamber;
 a deformable first measuring element coupled to the diaphragm; and
 an arrangement coupled to the first measuring element, the arrangement being configured to generate a signal in response to a deformation of the diaphragm and to generate a signal in response to a deformation of the first measuring element; the method comprising the step of measuring a pressure in a combustion chamber of a combustion engine through the deformation of the first measuring element, wherein the deformation of the first measuring element is responsive to the deformation of the diaphragm.

24. The method according to claim 23, wherein the first measuring element includes a bendable bar having one end freely suspended.

25. The method according to claim 23, wherein the pressure sensor includes a stop element being configured to oppose a deformation force in response to a predetermined deformation of the first measuring element.

26. The method according to claim 25, wherein the stop element includes a flexible second measuring element, the second measuring element being one of harder and flexurally stiffer than the first measuring element.

27. The method according to claim 25, wherein the stop element includes one of a half-open diaphragm and a bendable bar having one end freely suspended.

28. The method according to claim 25, wherein at least one of the first measuring element and the stop element includes at least one piezoelectric element.

29. The method according to claim 25, wherein the pressure sensor includes a transmission element configured to transmit force from the diaphragm to at least one of the first measuring element and the stop element.

30. The method according to claim 29, wherein the transmission element includes one of a selected elasticity and a selected flexural stiffness, one of a measuring range and measuring ranges of the pressure sensor being determined in accordance with the one of the selected elasticity and the selected flexural stiffness.

31. The method according to claim 29, wherein the transmission element includes at least one of a diaphragm and a chip, the at least one of the diaphragm and the chip having a thickness, one of a measuring range and measuring ranges of the pressure sensor being determined in accordance with the thickness.

32. The method according to claim 29, wherein at least one of the diaphragm, the transmission element, the first measuring element and the stop element includes an aiming-off allowance, the aiming-off allowance being configured to compensate for manufacturing tolerances during coupling;

and wherein the diaphragm is slightly curved to an outside in accordance with the aiming-off allowance.

33. The method according to claim 25, wherein at least one of the first measuring element and the stop element includes one of a bar and a tongue disposed in a chip.

34. The method according to claim 33, wherein the chip is a single chip.

35. The method according to claim 23, wherein the arrangement includes a piezoresistor connected to a Wheatstone bridge.

36. The method according to claim 23, wherein the pressure sensor is configured to measure at least two measuring ranges.

37. The method according to claim 36, wherein a first measuring range of the at least two measuring ranges is 0 to 10 bar and a second measuring range of the at least two measuring ranges is 0 to 300 bar.

38. The method according to claim 37, wherein the first measuring range is 0 to 2 bar.

39. The method according to claim 37, wherein the second measuring range is 0 to 200 bar.

40. The method according to claim 38, wherein the second measuring range is 0 to 200 bar.

41. The method according to claim 23, wherein the pressure sensor includes an overload protection device.

42. The method according to claim 41, wherein the overload protection device is configured to provide overload protection at approximately 300 bar.

43. The method according to claim 41, wherein the overload protection device is configured to provide overload protection at approximately 250 bar.

44. The method according to claim 23, wherein the diaphragm is formed of steel.

* * * * *